United States Patent
Merz et al.

(10) Patent No.: US 12,240,165 B2
(45) Date of Patent: Mar. 4, 2025

(54) METERING DEVICE, DEVICE AND METHOD FOR ADDITIVELY PRODUCING A THREE-DIMENSIONAL OBJECT

(71) Applicant: EOS GmbH Electro Optical Systems, Krailling (DE)

(72) Inventors: Karl Merz, Reinach (CH); Andreas Baumann, Gräfelfing (DE); Ulrich Schmid, Dießen am Ammersee (DE)

(73) Assignee: EOS GmbH Electro Optical Systems, Krailling (DE)

( * ) Notice: Subject to any disclaimer, the term of this patent is extended or adjusted under 35 U.S.C. 154(b) by 202 days.

(21) Appl. No.: 16/150,450

(22) Filed: Oct. 3, 2018

(65) Prior Publication Data

US 2019/0126552 A1 May 2, 2019

(30) Foreign Application Priority Data

Oct. 11, 2017 (DE) .......................... 102017218175.3

(51) Int. Cl.
| | | |
|---|---|---|
| *B29C 64/153* | (2017.01) | |
| *B22F 10/28* | (2021.01) | |
| *B22F 12/13* | (2021.01) | |
| *B22F 12/57* | (2021.01) | |
| *B22F 12/60* | (2021.01) | |

(Continued)

(52) U.S. Cl.
CPC ............ *B29C 64/153* (2017.08); *B22F 12/57* (2021.01); *B29C 64/218* (2017.08); *B29C 64/343* (2017.08); *B29C 64/386* (2017.08); *B33Y 30/00* (2014.12); *B22F 10/28* (2021.01); *B22F 12/13* (2021.01); *B22F 12/60* (2021.01); *B22F 2999/00* (2013.01); *B33Y 10/00* (2014.12)

(58) Field of Classification Search
CPC .. B22F 2999/00; B22F 3/1055; B29C 64/153; B29C 64/218; B29C 64/343; B29C 64/386; B33Y 10/00; B33Y 30/00
See application file for complete search history.

(56) References Cited

U.S. PATENT DOCUMENTS

| | | | |
|---|---|---|---|
| 2005/0074550 A1 | 4/2005 | Leuterer et al. | |
| 2008/0317951 A1* | 12/2008 | Green ................ | B23K 35/0244 118/52 |

(Continued)

FOREIGN PATENT DOCUMENTS

| | | |
|---|---|---|
| DE | 19937558 | 2/2000 |
| DE | 102013007482 | 10/2014 |

(Continued)

*Primary Examiner* — John J DeRusso
*Assistant Examiner* — Victoria Bartlett
(74) *Attorney, Agent, or Firm* — Polsinelli PC (57) ABSTRACT

A metering device serves as an equipping or retrofitting kit for a device for producing a three-dimensional object by means of solidifying, layer by layer, a building material in powder form at those positions that correspond to the cross-section of the object to be produced in the respective layer. The metering device has a metering element, which metering element is rotatable about an axis, preferably an axis of its own, particularly preferably about an, in particular its own, longitudinal axis and which is suitable for dispensing the building material in powder form in a metered manner. The metering element is designed to dispense locally different amounts of powder along the direction of the axis.

9 Claims, 4 Drawing Sheets

(51) Int. Cl.
*B29C 64/218* (2017.01)
*B29C 64/343* (2017.01)
*B29C 64/386* (2017.01)
*B33Y 10/00* (2015.01)
*B33Y 30/00* (2015.01)

(56) References Cited

U.S. PATENT DOCUMENTS

| | | |
|---|---|---|
| 2011/0029823 A1 | 2/2011 | Horley et al. |
| 2011/0293823 A1 | 12/2011 | Bruderer et al. |
| 2014/0363585 A1 | 12/2014 | Pialot et al. |
| 2016/0311164 A1* | 10/2016 | Miyano .................. B33Y 30/00 |
| 2018/0200792 A1* | 7/2018 | Redding ............ B23K 37/0235 |
| 2018/0222112 A1 | 8/2018 | Danzig et al. |
| 2020/0223137 A1* | 7/2020 | Swier ..................... B33Y 70/00 |

FOREIGN PATENT DOCUMENTS

| | | |
|---|---|---|
| WO | 2002062560 | 8/2002 |
| WO | 2010094500 | 8/2010 |
| WO | 2017009249 | 1/2017 |
| WO | 2017108867 | 6/2017 |

* cited by examiner

METERING DEVICE, DEVICE AND METHOD FOR ADDITIVELY PRODUCING A THREE-DIMENSIONAL OBJECT

TECHNICAL FIELD OF THE INVENTION

The present invention refers to a device and a method for additively producing a three-dimensional object by applying, layer by layer, and selectively solidifying of a building material in powder form, in particular to a metering device for a building material in powder form contained in this device and used in this method.

BACKGROUND OF THE INVENTION

Devices and methods of this type are used in rapid prototyping, rapid tooling or additive manufacturing, for example. An example of such a method is known as "selective laser sintering or laser melting". In this method, a thin layer of a building material in powder form is repeatedly applied and the building material is selectively solidified in each layer by selectively irradiating positions that correspond to a cross-section of the object to be produced with a laser beam.

In order to obtain an object of good quality, it is important, among other things, that the applied powder layers are applied as uniform layers with a predetermined thickness, i.e. layer thickness, for which an exact metering of the powder for the layer application is necessary. Application of a layer is implemented by means of a recoater being moved over a build area in a recoating direction. For an exact metering of the powder quantity required for the application of a layer, from WO 02/062560 A1 a metering roller is arranged at the outlet opening of a filling container. The surface of the metering roller has symmetrically arranged notches extending in axial direction and which can accommodate a defined volume of powder. This makes it possible to supply a defined quantity of powder to the recoater.

Normally, the recoater extends over a width of the build area and is moved along the length of the build area in order to apply a layer. The powder layer applied in this way usually has a rectangular cross-section. However, depending on the geometry of the object to be produced and/or an arrangement of several objects to be produced in one building space, it can be advantageous if the applied powder layer (i.e. the recoating area) is a non-rectangular area.

This can be realized, for example, with a recoater disclosed in WO 2017/009249. The recoater comprises a plurality of storage chambers which can dispense building material in powder form independently of each other. This allows the recoater to also dispense locally different amounts of powder perpendicular to its direction of movement. With said recoater, the accuracy of powder metering perpendicular to the recoating direction is determined by the number of storage chambers and their dimensions perpendicular to the direction of movement of the recoater.

SUMMARY OF THE INVENTION

It is an object of the present invention to provide an alternative or improved device or an alternative or improved method for additively producing a three-dimensional object by means of applying, layer by layer, and selectively solidifying a building material in powder form, in particular to provide a metering device contained in this device and used in this method by means of which it is possible to provide locally different amounts of powder for a layer application.

This object is achieved by a metering device, a recoater, a device, a method for metering and a method. The methods can also be further developed by the features of the devices, which features are given below. A device can also be further developed by the features of another device and a method can also be further developed by the features of another method.

A metering device according to the invention serves as an equipment kit or retrofitting kit for a device for producing a three-dimensional object by means of solidifying, layer by layer, a building material in powder form at those positions that correspond to the cross-section of the object to be produced in the respective layer. The metering device has a metering element, which metering element is rotatable about an axis, preferably an axis of its own, particularly preferably about an, in particular its own, longitudinal axis and is suitable for dispensing the building material in powder form in a metered manner, wherein the metering element is designed to dispense locally different amounts of powder along the direction of the axis.

The longitudinal axis is defined here as an axis of the metering element extending along a longitudinal side of the metering element, preferably a central axis. Since the density of the powder received and dispensed by the metering element can be assumed to be substantially constant, the quantity of powder dispensed is directly proportional to the dispensed powder volume. The metering element is thus designed, among other things, to dispense locally different volumes of powder along the direction of the axis.

With such a metering device it is possible, for example, to provide locally different powder quantities for the application of a powder layer in a simple manner. Thus, for example, the shape of the applied powder layer can deviate from a rectangular shape. Thus, for example, it is possible to adapt a recoating area (also referred to as powder application area) in which powder is applied to a shape of a building platform that deviates from a rectangular shape, in particular a round, oval or other shape. The recoating area can also be adapted to a geometry of the object to be produced, in particular to a certain layer-parallel object cross-section and/or to a maximum dimension of the object in a layer-parallel direction and/or to a two-dimensional projection of the object onto a layer-parallel plane. The recoating area, for example, can also be adapted to a spatial arrangement of several objects to be produced in a building space. The recoating area refers to that area of a build area in which a layer application of the building material actually takes place or is to take place necessarily. The maximum recoating area is therefore preferably substantially the build area. The term "layer-parallel" is to be understood as a direction or a plane parallel to the applied powder layers, i.e. perpendicular to a direction in which the building process progresses.

This makes it possible, for example, to reduce the amount of powder required for applying a layer compared to an (imaginary) rectangular recoating area and thus to make the production process more cost-effective and time-efficient. Saving on powder quantities can be particularly advantageous, for example, when using precious metal powders or other relatively expensive types of powder.

In addition to powder application in a non-rectangular recoating area, it is also possible, for example, to use the inventive metering device to provide an additional powder quantity at positions where depressions are caused due to a compaction of the building material induced by the solidification process.

Preferably, the metering device comprises a metering container for storing the building material in powder form, wherein preferably the axis (i.e. the axis of the metering element) is mounted rotatably on the metering container, more preferably on a lower opening of the metering container. The axis of the metering element is thus realized as a physically tangible mechanical element or element arrangement and is mounted as described above. The building material can thus, for example, be dispensed locally differently, i.e. with locally varying amounts of powder, from the metering container by means of the metering element.

Preferably, at least one surface of the metering element comprises at least one indentation having a defined volume, which indentation is suitable for receiving a defined amount of powder. Further preferably, a sub-volume of the at least one indentation from the surface to a bottom of the indentation in a first section along the direction of the axis of the metering element is greater than in a second section along the direction of the axis of the metering element. The first and second sections can, for example, be identical sub-areas of the surface of the metering element in relation to their geometric shape and size. Thus, for example, a metering device for dispensing locally different amounts of powder can be provided in a simple manner.

The at least one indentation preferably extends substantially in a longitudinal direction, preferably in the direction of the longitudinal axis, of the metering element. The indentation can be shaped angular. The at least one indentation is preferably designed to be deeper and/or wider in its central region than in a marginal region with respect to the longitudinal direction. This means that a dimension of the at least one indentation transversely to the longitudinal direction is preferably larger in its central region than in a marginal region in relation to its longitudinal direction. Here, a marginal region of the indentation denotes an end region of the indentation along the longitudinal direction, i.e. a region in which the indentation ends referring to the longitudinal direction. Alternatively or in addition, the depth and/or width of the at least one indentation decreases preferably in a stepless manner from the center towards the edge and/or the at least one indentation preferably has a non-angular, preferably oval, more preferably longitudinally oval, even more preferably elliptical contour. Thus, for example, a metering element is provided that dispenses a larger quantity of powder in its central region than in a marginal region referring to the longitudinal direction.

A rotationally symmetrical metering element is particularly suitable as an inventive metering element, in particular if the axis of symmetry or axis of rotation is a longitudinal axis of the metering element. Therefore, the metering device preferably comprises a roller, further preferably it is designed as a roller. Preferably, the roller comprises at least two, preferably more than two, indentations arranged in the circumferential direction of the roller, which indentations are preferably spaced at equal distance from one another. Thus, for example, several steps of metering can be implemented by a rotation of the roller.

Preferably, the metering device further comprises a wiping element for removing the building material in powder form from at least a section of the at least one indentation. With such a wiping element, for example, substantially all of the powder contained in an indentation can be removed and dispensed from it, thus improving the accuracy of powder metering, i.e. a powder quantity actually dispensed substantially corresponds to a powder quantity specified by a (sub-)volume of the indentation.

A recoater according to the invention serves for equipping or retrofitting a device for producing a three-dimensional object by means of solidifying, layer by layer, a building material in powder form at those positions that correspond to the cross-section of the object to be produced in the respective layer and comprises at least the metering device described above. The recoater is preferably configured to spread the building material dispensed by the metering device in a recoating direction (i.e. an intended direction of movement of the recoater) to form a layer, preferably a uniformly thin layer. For this purpose, the recoater can, for example, have at least one recoating element (such as a blade) which preferably extends in a direction transverse, preferably perpendicular, to the intended direction of movement of the recoater and/or in the direction of the axis of the metering element.

A device according to the invention for producing a three-dimensional object by means of solidifying, layer by layer, a building material in powder form at those positions that correspond to the cross-section of the object to be produced in the respective layer, the device having a recoater which can be moved over a build area in a recoating direction for applying a layer of the building material in the build area, comprises a metering device according to the invention and/or the recoater comprises a metering device according to the invention. Thus, for example, the effects described above with respect to a metering device according to the invention and a recoater according to the invention can also be achieved in an additive layer-wise building device.

Preferably, at an angle, in particular transverse, to the recoating direction of the recoater, the build area has different dimensions along the recoating direction. When using such a build area, the build area can be well adopted to a geometry the recoating area, for example.

The metering device can be arranged in the device so as to be movable together with the recoater over the build area. Alternatively or additionally, the metering device can be arranged in the device at an intended rest and/or filling position of the recoater. In the latter case, for example, a locally varying amount of building material can be provided by the metering device on one side of the build area and then be spread to a layer by the recoater moving over the build area in the recoating direction.

According to the invention, a method of metering a building material in powder form in a device for producing a three-dimensional object by means of solidifying, layer by layer, the building material in powder form at those positions that correspond to the cross-section of the object to be produced in the respective layer comprises the following steps:

Providing a metering device having a metering element, which metering element is rotatable about an axis, preferably an axis of its own, particularly preferably about an, in particular its own, longitudinal axis, and which dispenses the building material in powder form in a metered manner, wherein the metering element dispenses locally different amounts of powder along the direction of the axis.

According to the invention, a method of producing a three-dimensional object by means of solidifying, layer by layer, a building material in powder form at those positions that correspond to the cross-section of the object to be produced in the respective layer, wherein at least one layer of building material in powder form is applied in a build area by means of a recoater moving in a recoating direction over the build area, comprises the method described above for metering of the building material in powder form.

Thus, for example, the effects described above with respect to a metering device according to the invention and a recoater according to the invention and a device according to the invention can also be achieved in a method for metering and an additive layer-wise building process.

BRIEF DESCRIPTION OF THE DRAWINGS

Further features and expediencies of the invention are set out in the description of exemplary embodiments with the aid of the attached drawings.

DETAILED DESCRIPTION OF THE EMBODIMENTS

Figure 1:
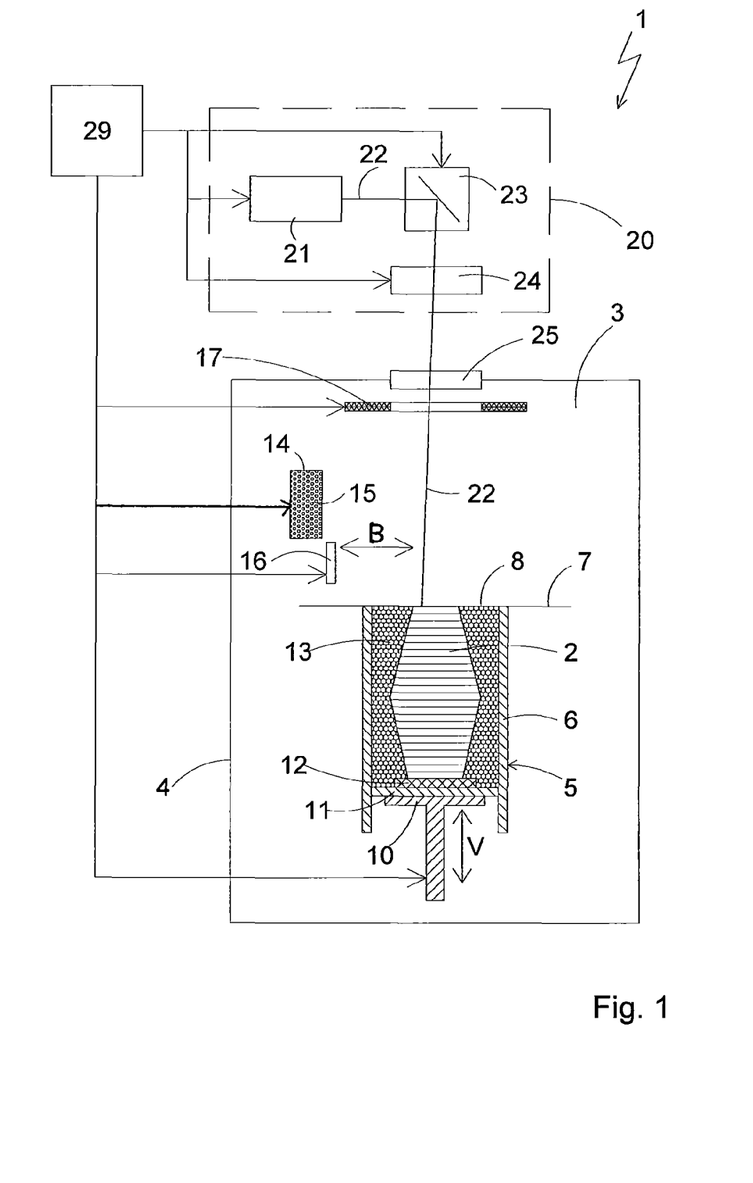
FIG. 1 shows a schematic view, partially in cross-section, of a device for additively producing a three-dimensional object according to an embodiment of the present invention.

Hereafter, an embodiment of the present invention is described with reference to FIG. 1. The device shown in FIG. 1 is a laser sintering or laser melting device 1. For building an object 2, it comprises a processing chamber 3 with a chamber wall 4.

A container 5 open to the top with a container wall 6 is arranged in the processing chamber 3. A working plane 7 is defined by the upper opening of the container 5, wherein the area of the working plane 7 located within the opening, which can be used for building the object 2, is referred to as build area 8.

In the container 5, a support 10 is arranged that can be moved in a vertical direction V and to which a base plate 11 is attached which seals the container 5 at the bottom and thus forms the bottom thereof. The base plate 11 can be formed as a plate separately from the support 10 which plate is fixed to the support 10, or it can be integrally formed with the support 10. Depending on the powder and process used, a building platform 12 can also be arranged on the base plate 11 as a building base on which the object 2 is built. However, the object 2 can also be built on the base plate 11 itself, which then serves as a building base. In FIG. 1, the object 2 to be formed in the container 5 on the building platform 12 is shown below the working plane 7 in an intermediate state with several solidified layers, surrounded by building material 13 that remained unsolidified.

The laser sintering device 1 further comprises a metering device with a metering container for a building material in powder form 15 that can be solidified by electromagnetic radiation. The metering container has at its bottom a dispensing opening that is not shown in FIG. 1 in which dispensing opening a metering element designed as a roller is provided. This roller/metering element, also referred to as metering roller in the following, is described below in more detail with reference to FIGS. 2, 3a, 3b. Moreover, a storage container (not shown) for storing the building material in powder form can also be arranged in the device 1 which storage container is configured to supply building material in powder form 15 to the metering device 14.

The device 1 further comprises a recoater 16 that can be moved in a horizontal direction B, also referred to as recoating direction in the following, for applying building material 15 to the build area 8. Preferably, the recoater 16 extends transversely to its direction of movement over the entire area to be coated (i.e. the area where building material is to be applied).

Optionally, a radiant heater 17 is arranged in the processing chamber 3 for preheating the applied building material 15. For example, an infrared heater can be provided as a radiant heater 17.

The laser sintering device 1 further comprises an irradiation device 20 with a laser 21 which produces a laser beam 22 which is deflected by a deflection device 23 and focused upon the working plane 7 by way of a focusing device 24 through a coupling window 25 that is arranged on the upper side of the processing chamber 3 in the chamber wall 4.

Furthermore, the laser sintering device 1 comprises a control unit 29 by which the individual components of the device 1 can be controlled in a coordinated manner in order to implement the building process. The control unit can also be arranged partially or completely outside the device. The control unit can comprise a CPU, the operation of which is controlled by a computer program (software). The computer program can be stored separately from the device 1 on a storage medium from which it can be loaded into the device 1, in particular into the control unit 29.

During operation, in order to apply a powder layer, the support 10 is first lowered by an amount that corresponds to the desired layer thickness, i.e. layer strength. The recoater 16 first moves to the metering device 14 and therefrom receives a quantity of the building material 15 sufficient for applying a layer. The recoater 16 then moves over the build area 8, there applies building material in powder form 15 to the building platform 12 or a powder layer already present and spreads it to a powder layer. Application takes place at least over the entire cross-section of the object 2 to be produced. The area in which layer application takes place is referred to as recoating area or application area. The recoating area is thus preferably the entire build area 8, i.e. the area confined by the container wall 6. Optionally, the building material in powder form 15 is preheated by the radiant heater 17 to a working temperature.

Then, the cross-section of the object 2 to be produced is scanned by the laser beam 22 so that the building material in powder form 15 is solidified at those positions that correspond to the cross-section of the object 2 to be produced. By doing so, the powder grains are melted partially or completely at those positions by means of the energy introduced by the radiation so that they are present joint together as a solid body after cooling. These steps are repeated until the object 2 is completed and can be removed from the process chamber 3.

Figure 2:
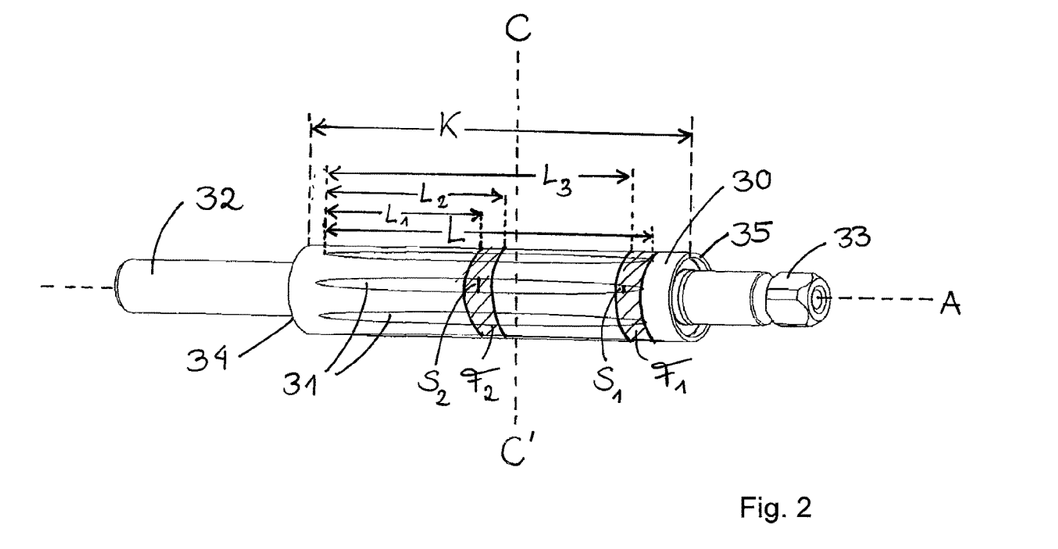
FIG. 2 shows a perspective view of a metering element according to an embodiment of the present invention.

FIG. 2 shows a metering element according to an embodiment of the invention. The metering element is designed as a roller 30 and has a longitudinal axis A. The roller 30 is mounted in the dispensing opening of the metering container by means of fixation elements and/or receiving elements 32, 33 so as to be rotatable about its longitudinal axis A. The roller 30 extends along the longitudinal direction A over a length K between its outer edges 34 and 35 and has a constant circular cross-section substantially along its entire length K. On its surface, the roller 30 has several indentations 31 (here eight ones, of which three ones are completely visible in the figure) which indentations are regularly spaced apart in circumferential direction. Each of the indentations 31 extends over an indentation length L along the length K of the roller 30, i.e. parallel to its longitudinal axis A and preferably up to a distance from the outer edge 34 and 35 of roller 30. Moreover, the indentations 31 have a substantially elliptical contour in the plane of the surface of the roller. Furthermore, FIG. 2 shows a first surface section $F_1$ and a second surface section $F_2$ on the surface of the roller 30. The surface sections have both the shape of a straight circular cylinder and have the same area. One surface section $F_2$ extends in a length range between a first edge distance $L_1$ and a second edge distance $L_2$ of the roller 30 and $F_1$ in a length range between a third edge distance $L_3$ and the indentation length L. The three mentioned edge distances $L_1$, $L_2$, $L_3$ extend along partial lengths of the indentation length L and all start at the end of the indentation length L arranged on the left in the figure. In relation to the longitudinal direction A of the roller 30, the first surface section $F_1$ is thus a right marginal region of the roller 30 and the second surface section $F_2$ is a central region of the roller 30 in relation to its longitudinal extent. Similarly, there is a left marginal region of the roller 30, which, however, is not indicated in FIG. 2. The indentations 31 have widths $S_1$, $S_2$ along the circumference of the roller 30, wherein it can be seen that the width $S_1$ in the surface section $F_1$ is smaller than the width $S_2$ in the surface section $F_2$.

Figure 3A:
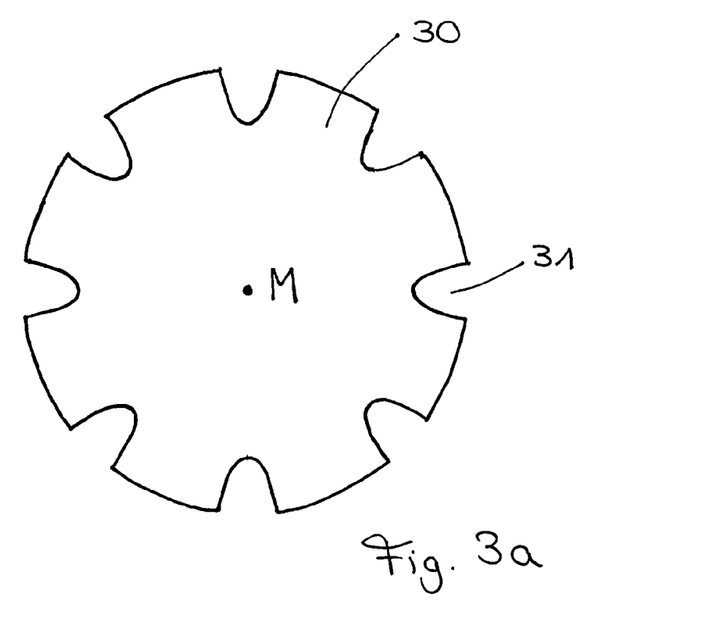
FIG. 3a shows a schematic view in cross-section of the metering element shown in FIG. 2 along the dashed line C C' shown in FIG. 2.
Figure 3B:
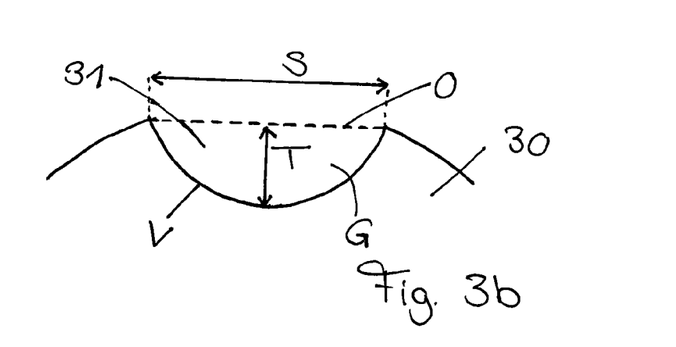
FIG. 3b shows an enlarged section of the cross-sectional view shown in FIG. 3a and FIG. 4 shows a schematic view of a build area from above within the frame of the implementation of the present invention.

FIG. 3a shows a cross-sectional area of the roller 30 shown in FIG. 2 perpendicular to its longitudinal axis A along the dashed line C-C' and FIG. 3b shown an enlarged section of an indentation 31 of the roller 30 shown in FIG. 3a. The longitudinal axis A of the roller 30 passes through the center M of the cross-sectional area shown in FIG. 3a and perpendicular to the cross-sectional area. The indentations 31 each are substantially U- or V-shaped recesses or recesses shaped as a section of a circle (contour line V in FIG. 3b) referring to an imaginary surface O (dashed line in FIG. 3b) of the indentation 31. The indentations 31 each have a depth T and a width S, wherein the depth T is the maximum distance of the contour line V from the surface O of the indentation 31 in the cross-sectional area and the width S is the line of intersection of the surface O with the contour line V in the cross-sectional area. The depth T and the width S are thus dimensions in the cross-sectional area of the roller 30 perpendicular to its longitudinal axis A. The surface O and the contour line V enclose an area G of the indentation 31 in the cross-sectional area. The total volume of the indentation 31 is thus given as an integral of the areas G over the entire indentation length L of the indentation 31. Similarly, the total volume of all indentations 31 of the roller 30 can be determined by adding the total volumes of the individual indentations 31.

Preferably, the width S and/or the depth T of the indentation 31 decrease continuously in the direction of the axis A from the center of the roller 30 to its edge 34, 35, in the present exemplary embodiment this applies both to the width S and to the depth T. FIG. 2 exemplary shows the width $S_1$ of an indentation 31 in the marginal region $F_1$ and the width $S_2$ of the indentation in the central region $F_2$, wherein the width $S_1$ is smaller than the width $S_2$, as mentioned. Consequently, also the area G of the indentation 31 decreases in a cross-section from the central region $F_2$ to the marginal region $F_1$. Accordingly, the sub-volume contained in the central region $F_2$ of the indentations 31 is greater than the sub-volume contained in the marginal region $F_1$. The roller 30 can therefore accommodate more powder (i.e. a greater powder volume and thus a greater powder quantity) in its central region $F_2$ than in its marginal region $F_1$.

To provide a quantity of powder for applying a layer, the roller 30 is rotated about its longitudinal axis A in the dispensing opening of the metering container. In doing so, those indentations 31 of the roller 30 that come into contact with the powder stored in the container accommodate powder quantities corresponding to their volume. Those indentations 31 revealed by the dispensing opening, i.e. those indentations on the roller 30 that are located opposite to the powder stored in the container, dispense the powder. In doing so, the powder can be brought out of the indentations in a downward direction by means of gravity, for example. This can be additionally supported by a wiping element (not shown), which wiping element is arranged and designed in such a way that it engages, i.e. is introduced automatically or semi-automatically, into the indentation 31 during rotation of the roller 30 about its axis A and which wiping element mechanically removes the powder contained in the respective indentation 31 from the indentation.

Figure 4:
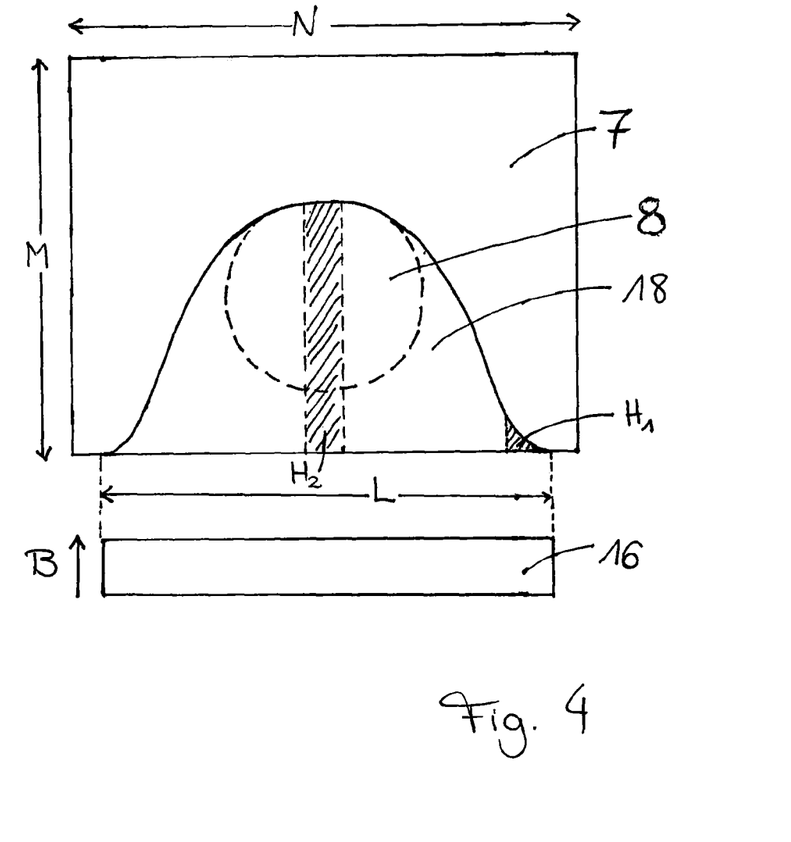

FIG. 4 shows a view of a region of the working plane 7 from above with a powder layer applied in a recoating area 18 within the working plane 7 and a recoater 16 in a rest position outside that region of the working plane 7 that is shown in FIG. 4. The rectangular region of the working plane 7 shown in FIG. 4 has a width N and a length M, for example. A recoating element (e.g. one or more blades) of the recoater 16 extends at least over the indentation length L of the indentations 31 of the roller 30 and is arranged in device 1 so as to be movable parallel to the width N of the region of the working plane shown and in the recoating direction B along the length M of the region of the working plane shown. The metering device 14 (not shown in FIG. 4) is arranged in the device 1 above the rest position of the recoater 16 in such a way that the longitudinal axis A of the roller 30 is substantially perpendicular to the recoating direction B of the recoater 16.

The recoating area 18 is a sub-region of the working plane 7 and of the region of the working plane 7 shown in FIG. 4. All layer-parallel cross-sections of the object 2 to be produced are located within the recoating area 18. The recoating area 18 has a maximum dimension L perpendicular to the recoating direction B which maximum dimension corresponds to the indentation length L of the indentations 31 of the roller 30. The dimension of the recoating area 18 perpendicular to the recoating direction B decreases with increasing distance from the lower edge of the region of the working plane 7 (at which the recoater 16 starts the recoating process), i.e. decreases in the recoating direction B. Within the recoating area 18, a first strip-shaped sub-area $H_1$ and a second strip-shaped sub-area $H_2$ are shown which sub-areas each extend over a constant width in the recoating direction B. The first sub-area $H_1$ denotes that region of a powder layer in which the building material in powder form dispensed from the marginal region $F_1$ of the roller 30 to the recoater 16 is spread by the recoater 16. Correspondingly, the second sub-area $H_2$ denotes that region of the powder layer in which the building material in powder form dispensed from the central region $F_2$ of the roller 30 to the recoater 16 is spread by the recoater 16. Since the powder quantity dispensed from the central region $F_2$ is larger than the powder quantity dispensed from the marginal region $F_1$ and the recoater 16 spreads the locally varying powder quantities to a uniform layer, the sub-area $H_2$ has a larger area or length dimension than the sub-area $H_1$ in the recoating direction B.

Furthermore, FIG. 4 shows (dashed circle) a circular build area 8 (in consequence of a circular building platform 12). As can be seen in FIG. 4, the geometric shape of the recoating area 18 in which application of powder takes place is adapted to the geometric shape or the position of the build area 8. Thus, the recoating area 18 does not cover the entire region of the working plane 7 shown in FIG. 4 or the entire area the recoater 16 or its recoating element is able to move across, but the dimensions of the recoating area perpendicular to the recoating direction B decrease in the recoating direction with increasing distance from the edge of the region of the working plane 7, as described above, so that the recoating area 18 has a curvature that is adapted to the circular build area 8.

The build area 8, being defined as the area of the working plane 7 located inside the opening of the container 5, as described above, can have a rectangular shape, but it can also have a non-rectangular shape, for example a circular shape as shown in FIG. 4. The geometric shape of the recoating area 18 can then be adapted to the geometric shape of the build area 8 or vice versa the build area 8 can also be adapted to the geometric shape of the recoating area.

Moreover, overflow slits can be provided in the device 1, which overflow slits accommodate powder from regions of the recoating area located outside the build area 8.

The indentations 31 on the surface of the roller 30 are not limited to the shape described above. Rather, the indentations can have any geometric shape, extend and dimension (in particular width and depth). In addition, they do not need to be regularly spaced apart on the roller surface. There can also be fewer indentations, e.g. just one, or more indentations than those eight indentations shown in FIG. 3a provided in the roller. In general, the indentations of the roller are designed and/or arranged on the roller in such a way that the roller is suitable for dispensing locally different amounts of powder along its longitudinal axis A so that a recoating area adapted to the object to be produced can be achieved.

In addition, a wiping element can be provided at the roller 30 for removing the building material in powder form from the indentations 31.

In the laser sintering or laser melting device described above, also several objects can be built simultaneously on the building base. In this case, the recoating area is preferably not only adapted to the geometry of the layer-parallel object cross-sections but also to the spatial arrangement of the objects to be produced on the building base or in the building container.

The metering roller described above is used at least for providing a quantity of powder for a layer application in the course of the production process of one or more three-dimensional objects. Different rollers can also be used for different layers so that at least two powder layers can be applied in different recoating areas. This means that a recoating area does not need to contain all layer-parallel cross-sections of the object to be produced.

According to the embodiment described above, the metering device is arranged stationary in the device and dispenses the required powder quantity locally differentiated along the direction of its longitudinal axis A at the beginning of a layer application. Alternatively or additionally, however, the metering device can also be arranged in the device so as to be movable over the recoating area in the recoating direction together with the recoater, for example, the metering device can be formed integrally with the recoater.

Even though the present invention was described with regard to a laser sintering or laser melting device, it is not limited to laser sintering or laser melting. It can be applied to any methods for additively producing a three-dimensional object by layer-wise applying and selectively solidifying a building material in powder form.

The irradiation device can comprise, for example, a gas or solid state laser or any other kind of laser, such as laser diodes, in particular VCSEL (Vertical Cavity Surface Emitting Laser) or VECSEL (Vertical External Cavity Surface Emitting Laser) or an array of these lasers. In general, any device can be used as an irradiation device with which energy in the form of wave radiation or particle radiation can be applied selectively to a layer of building material. Instead of a laser, for example, a different light source, an electron beam or any other source of energy or radiation can be used which is suited for solidifying the building material. Instead of deflecting a beam, irradiation can also be implemented by means of a movable array irradiation device. The invention can also be applied to selective mask sintering, in which an extended light source and a mask are used, or the invention can be applied to high speed sintering (HSS), in which a material is selectively applied to the building material that increases (absorption sintering) or reduces (inhibition sintering) the absorption of radiation at the respective positions and then is irradiated unselectively and in a large area or by means of a movable array irradiation device. In general, the invention is directed to the additive production of an object by means of layer-wise applying and selectively solidifying a building material in powder form, regardless of the manner in which the building material is solidified.

Various kinds of powder can be used as a building material, in particular metal powders, such as precious metal powders (e.g. gold) or powders containing a precious metal, as well as plastic powders, ceramic powders, sand, filled or mixed powders.

The invention claimed is:

1. A device for producing a three-dimensional object by solidifying, layer by layer, a building material in powder form at positions corresponding to a cross-section of the object to be produced, the device comprising:
    a recoater that moves over a working plane in a recoating direction for applying a layer of the building material in a recoating area,
    wherein:
        at an angle to the recoating direction of the recoater, the recoating area has different dimensions along the recoating direction; and
        the recoating area has a non-rectangular shape;
    a metering device that is arranged to be stationary in the device at an intended rest and/or filling position of the recoater, wherein the metering device has a metering roller, the metering roller being rotatable about its longitudinal axis and being suitable for dispensing the building material in powder form in a metered manner,
    wherein:
        at least one surface of the metering roller comprises at least one indentation having a defined volume;
        the at least one indentation is suitable for receiving a defined amount of powder;
        the at least one indentation extends substantially in the longitudinal direction of the metering roller;
        the at least one indentation having a width and/or a depth that varies along the longitudinal direction of the metering roller; and
        the depth and/or width of the at least one indentation varying in a stepless manner along the longitudinal direction;
    wherein the varying depth and/or width of the at least one indentation provides such a shape to the indentation that the non-rectangular shape of the recoating area is achieved when the building material is dispensed by the metering roller and drawn out by the recoater to form the recoating area.

2. The device according to claim 1, wherein the metering device comprises a metering container for storing the building material in powder form and wherein the axis is mounted on a lower opening of the metering container.

3. The device according to claim 1, wherein a sub-volume of the at least one indentation from the surface to a bottom of the at least one indentation in a central region is greater than in a marginal region.

4. The device according to claim 1, wherein
the at least one indentation has a non-angular contour.

5. The device according to claim 1, wherein the metering roller comprises the at least two indentations arranged in a circumferential direction of the metering roller, the indentations being spaced at an equal circumferential distance from one another.

6. The device according to claim 1, wherein transverse to the recoating direction of the recoater, the recoating area has different dimensions along the recoating direction.

7. A device for producing a three-dimensional object by solidifying, layer by layer, a building material in powder form at positions corresponding to a cross-section of the object to be produced, the device comprising:
- a recoater that moves over a working plane in a recoating direction for applying a layer of the building material in a recoating area;
- a metering device, the metering device including a metering roller rotatable about its longitudinal axis and being suitable for dispensing the building material in powder form in a metered manner, wherein the metering device is arranged to be stationary in the device at an intended rest and/or filling position of the recoater,
- wherein the metering device includes at least one indentation suitable for receiving powder, the at least one indentation extending in a longitudinal direction from a central region of the metering device to a marginal region of the metering device;
- wherein the indentation variably extends in a radial direction of the metering device such that the at least one indentation has a larger depth and/or width in the central region than in the marginal region with respect to the longitudinal direction, such that a larger quantity of powder is dispensed in its central region than in the marginal region to achieve a non-rectangular shape of the recoating area when the building material is dispensed by the metering device and drawn out by the recoater to form the recoating area; and
- wherein the depth and/or width of the at least one indentation decreases in a stepless manner from the central region towards the marginal region.

8. The device according to claim 7, wherein the metering roller comprises at least two of the indentations arranged in a circumferential direction of the metering roller, the indentations being spaced at an equal circumferential distance from one another.

9. The device according to claim 7, wherein the metering device comprises a metering container for storing the building material in powder form and wherein the axis is mounted on a lower opening of the metering container.

* * * * *